United States Patent [19]

Höltje et al.

[11] 4,286,998

[45] Sep. 1, 1981

[54] LIGHT STABLE QUINACRIDONEQUINONE YELLOW PIGMENT

[75] Inventors: Wilfried G. Höltje; George H. Senkler Jr.; Arthur J. Taggi, all of Wilmington, Del.

[73] Assignee: E. I. DuPont de Nemours and Company, Wilmington, Del.

[21] Appl. No.: 153,208

[22] Filed: May 27, 1980

Related U.S. Application Data

[63] Continuation-in-part of Ser. No. 70,835, Aug. 29, 1979, which is a continuation-in-part of Ser. No. 969,533, Dec. 14, 1978, abandoned.

[30] Foreign Application Priority Data

Dec. 3, 1979 [CA] Canada ................................ 341100

[51] Int. Cl.$^3$ ............................................. C08H 17/14
[52] U.S. Cl. ................................................ 106/288 Q
[58] Field of Search ..................................... 106/288 Q

[56]          References Cited
        U.S. PATENT DOCUMENTS

| 2,913,348 | 11/1959 | Jackson | 106/288 Q |
| 3,160,510 | 12/1964 | Ehrich | 106/288 Q |
| 3,341,345 | 9/1967 | Ehrich et al. | 106/288 Q |
| 3,748,162 | 7/1973 | West | 106/288 Q |

*Primary Examiner*—James Poer

[57]         ABSTRACT

A solid solution of a quinacridonequinone with a stabilizer selected from the group consisting of 2-anilinoacridone, 5,6,7,8-tetrahydro-2-anilinoacridone, 6-anilinoquinolone and 2-aminoacridone of improved lightfastness is provided which displays improved dispersibility while still maintaining a high degree of transparency in automotive finishes when post-treated with a surfactant.

12 Claims, No Drawings

LIGHT STABLE QUINACRIDONEQUINONE YELLOW PIGMENT

CROSS-REFERENCE TO RELATED APPLICATIONS

This application is a continuation-in-part of application Ser. No. 070,835, filed Aug. 29, 1979 which, in turn, was a continuation-in-part of application Ser. No. 969,533, filed Dec. 14, 1978, now abandoned.

DESCRIPTION

1. Technical Field

Among the various known quinacridone derivatives are the quinacridonequinones. Quinacridonequinones have been described in the literature as having utility as pigments because of their intense yellow color and low solubility in organic media. As a practical matter, however, compositions pigmented with quinacridonequinones have proven to have extremely poor lightfastness as compared to those pigmented with quinacridone or other quinacridone derivatives.

2. Background Art

While it has been disclosed (U.S. Pat. No. 3,160,510) that quinacridonequinone could be used as one component of a solid solution of two or more quinacridone derivatives, such compositions have marked limitations since the ingredients are colored compounds which produce a red color in the final composition.

More recently colorless stabilizers, such as N,N-diphenyl-p-phenylenediamine (U.S. Pat. No. 3,341,345) and 6,13-dihydroquinacridone (U.S. Pat. No. 3,748,162), have been used in solid solution with quinacridonequinone.

Disclosure of the Invention

It has now been found that quinacridonequinones may be stabilized by forming a solid solution with a compound selected from the group consisting of 2-anilinoacridone; 5,6,7,8-tetrahydro-2-anilinoacridone; 6-anilinoquinolone; and 2-aminoacridone or mixtures thereof.

The structures of these compounds are as follows:

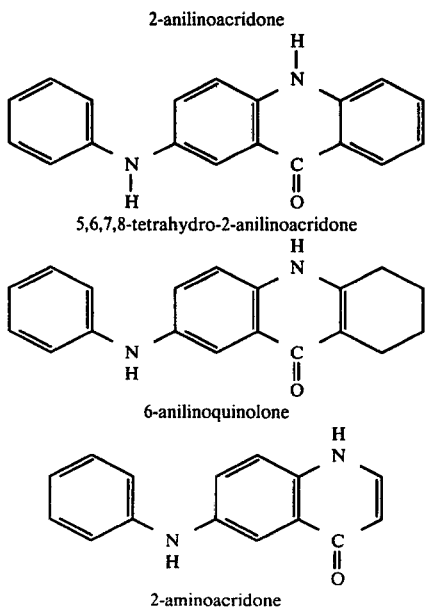

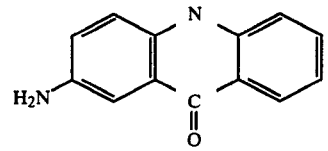

By quinacridonequinones are meant compounds of the following structural formula

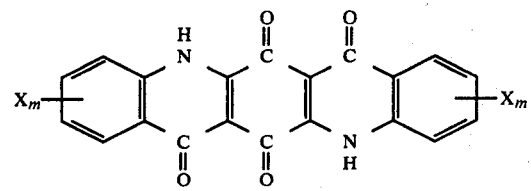

where X is selected from the group consisting of flourine, chlorine, bromine, a lower alkyl, a lower alkoxy and combinations of these groups and m is an integer from 0-2. The solid solutions of this invention are characterized by outstanding lightfastness and by superior two-tone effect in metallized finishes.

The compositions of this invention comprise solid solutions of (a) 1-20% by weight of the stabilizers or a mixture of the stabilizers; and (b) 80-90% by weight of quinacridonequinone. Of the enumerated stabilizers, 2-anilinoacridone is the preferred stabilizer because it imparts superior lightfastness properties to the quinacridonequinone. The preferred range of stabilizer is from 10-15% by weight of quinacridonequinone and stabilizers. The lower limit is provided to insure good long-term lightfastness properties while the upper limit although not critical to lightfastness is provided primarily for economic reasons.

The 5,6,7,8-tetrahydro-2-anilinoacridone can be prepared by a process comprising (1) condensing 2-cyclohexanonecarboxylate ester of the formula

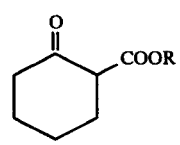

with N-phenyl-p-phenylenediamine in the presence of a catalytic amount of a strong acid at a temperature of from 80°-150° C. at sufficient pressure to remove by-product water to form a 2-{4'-[(phenyl)amino]phenyl}-aminocyclohexenecarboxylate ester of the formula

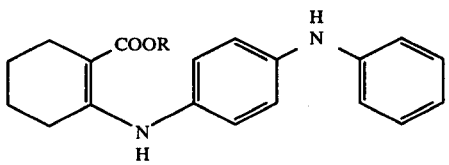

wherein R is as above;

(2) cyclizing the 2-{4'-[(phenyl)amino]phenyl}-aminocyclohexenecarboxylate ester by heating at a temperature of 180°–300° C. in an inert high boiling liquid to obtain 5,6,7,8-tetrahydro-2-anilinoacridone of the formula

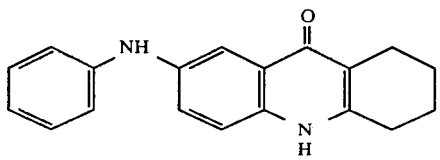

The 5,6,7,8-tetrahydro-2-anilinoacridone can be converted to 2-anilinoacridone by a process comprising dehydrogenating 5,6,7,8-tetrahydro-2-anilinoacridone by heating in an inert high boiling liquid in the presence of a catalytic amount of a supported palladium or platinum catalyst.

The condensation of the cyclohexanonecarboxylate ester with N-phenyl-p-phenylenediamine is conducted in the presence of a strong acid catalyst at 80°–150° C. and at a pressure that permits the removal of byproduct water.

Representative examples of the strong acid used are hydrochloric acid, sulfuric acid, p-toluenesulfonic acid, benzenesulfonic acid, trifluoroacetic acid, naphthalenesulfonic acid, toluenesulfonic acid, picric acid, o-phosphoric acid, pyrophosphoric acid and the like.

If a volatile acid is used, e.g., trifluoroacetic acid, an amine such as N-methylaniline may be added but is not required. The use of such an amine may tend to help reduce the loss of the volatile acid catalyst.

Generally, byproduct water is removed by vacuum distillation.

The condensation of the 2-cyclohexanonecarboxylate esters to form the 2-{4'-[(phenyl)amino]-phenyl}-aminocyclohexenecarboxylate ester can be carried out by starting with a pure form of the carboxylate esters that have been prepared and isolated according to procedures in the prior art. In such a case, the pure carboxylate ester in a solvent, e.g., benzene or toluene, is condensed with N-phenyl-p-phenylenediamine in the presence of a strong acid catalyst and the byproduct water removed by azeotropic distillation. However, before proceeding to cyclization, the solvent must be removed, e.g., by vacuum distillation.

The cyclizing of the 2-{4'-[(phenyl)amino]phenyl}-aminocyclohexenecarboxylate ester is carried out by heating a solution of the cyclohexenecarboxylate ester in an inert high boiling solvent at 180°–300° C. with the removal of byproduct alcohol. The product formed is 5,6,7,8-tetrahydro-2-anilinoacridone which is isolated in high purity by filtration of the reaction mixture after cooling and washing with an appropriate solvent, for example, methanol, ethanol, isopropanol, propyl alcohol, acetone, methyl ethyl ketone, tetrahydrofuran, etc.

The dehydrogenation reaction is carried out by heating the tetrahydroanilinoacridone as a suspension or a solution in an inert high boiling liquid in the presence of a supported palladium or platinum catalyst. The dehydrogenation catalyst is limited to supported palladium or platinum. The dehydrogenation catalyst is critical in achieving a product that can be prepared in a reasonable reaction time. Palladium is preferred because it yields the highest purity product.

The support for the catalyst may be selected from any known support materials such as carbon, silicon carbide, silica, alumina, aluminosilicates, inorganic silicates, inorganic carbonates, pumice, montmorillonite and the like that are stable under the reaction conditions. The preferred support materials are alumina and carbon. Generally, the form of the support can be powdered, granular or pelletized. Most preferred are alumina pellets due to commercial availability and ease in removal from the product slurry. Carbon powder supported catalysts are especially preferred because they give higher reaction rates and yield higher purity products.

The amount of supported catalyst based on the tetrahydroanilinoacridone can vary widely and depends on the support chosen. Generally, from 0.1–200% by weight of supported catalyst based on the tetrahydroanilinoacridone is used depending on the support. Generally, 20–90% by weight based on the tetrahydroanilinoacridone, preferably 40–90%, of the supported catalyst is used when the support is alumina pellets. Generally, 0.1–10% by weight based on the tetrahydroanilinoacridone, preferably 0.2–5% of the supported catalyst is used when the support is carbon powder.

The amount of platinum or palladium on the support generally varies from 0.1–15% by weight based on the weight of support depending on the support. Generally, 0.1–5% by weight of platinum or palladium based on the weight of alumina pellets, preferably 0.4–1%, or 2–15% by weight platinum or palladium based on the weight of carbon powder, preferably 5–10% is used.

In general, the higher the temperature at which the dehydrogenation is run, the greater the reaction rate. Generally, the dehydrogenation reaction is carried out at 180°–350° C., preferably 230°–300° C. The reaction may be run under pressure to increase the reaction temperature. Pressures from 1 atm to 20 atm are generally operable.

Dowtherm ® A (an inert high boiling liquid made up of neutectic mixture of 23.5% by weight biphenyl and 76.5% by weight diphenyl) is the preferred medium for the dehydrogenation reaction because of its high boiling point and because the desired product precipitates when the medium is cooled. This permits easy isolation of the product.

Solid solutions of the invention may be produced by methods known in the art, such as acid pasting. A preferred method, which yields uniformly small particles, is described in U.S. Pat. No. 3,607,336, the disclosure of which is incorporated herein by reference. According to this procedure, a sulfuric acid solution of the quinacridonequinone and stabilizer is drowned in highly turbulent water to form a precipitate of small particle size, followed by digestion of the precipitate at a temperature from 40° C. to the boil for about 10 minutes to about 2 hours. For purposes of the present invention, the solution is initially formed by dissolving in sulfuric acid the two or more components in the appropriate weight ratios.

In carrying out the high turbulence drowning techniques of U.S. Pat. No. 3,607,336, adjustments can be made to increase or lower the temperature rise which occurs on mixing water with the sulfuric acid solution. In general, the greater the increase in temperature rise or the higher the acid concentration in the pigment slurry, the greater will be the tendency to produce larger size pigment particles.

Following precipitation of the pigment particles, the slurry is digested at an elevated temperature to complete solid solution formation. The slurry is then filtered and washed to remove acid.

Particles should have an average crystal diameter of at least 100 Å to insure adequate dispersibility. Average crystal diameter is determined by X-ray diffraction line broadening where $$D = \frac{K\lambda}{\beta_{\frac{1}{2}} \cos\theta},$$

where D=degree of crystallinity expressed as a crystal diameter, $\lambda$=wave length of the monochromatic X-radiation, K=constant, $\beta_{\frac{1}{2}}$=diffraction peak width at half-maximum intensity, and $\theta$=diffraction angle of the peak used for the measurement.

Preferred particles have an average crystal diameter of 150-200 Å; in this form the pigment exhibits excellent dispersibility while still maintaining a high degree of transparency, as is needed for pigmentation of metallized automotive finishes.

However, the stabilizers act to a certain extent as crystal growth inhibitors when used in conjection with high turbulence drowning techniques. In order to improve the dispersibility of these pigments, a post-treatment heat development process may be performed. This treatment is comprised of the following steps:

(a) heating the pigment particles in an aqueous slurry of from 0.5-5.0 weight percent pigment to a temperature from 50°-100° C.;
(b) adjusting the pH of the slurry to from 7.0-10.0;
(c) adding from 2-15% by weight of a surfactant;
(d) agitating the slurry and maintaining the temperature until an average crystal diameter of more than 100 Å is obtained.

The pigment slurry may then be filtered, washed and dried or may be subjected to further surface treatments to enhance durability. Generally, the pigment slurry is neutralized and is treated with basic nickel carbonate as described in U.S. Pat. No. 2,913,348.

The post-treatment heat development process is preferably performed at a temperature from 85°-100° C. in order to decrease the duration of the process. The preferred pH range is from 8.5-9.5. Operating at a lower pH necessitates longer periods of heat treatment, while higher pH affects the color of the pigment. Preferably from 3-8% by weight of surfactant is added. Lesser amounts of surfactant necessitate longer periods of heat treatment, while larger amounts do not hasten growth enough to warrant the increased cost of the surfactant. Surfactants, which have been found useful are cationic surfactants such as commercial grades of cetyl trimethyl ammonium chloride, dicoco dimethyl ammonium chloride and nonionic surfactants such as commercial grades of octylphenoxy polyethoxy ethanol. Under the above-stated preferred conditions, the temperature is maintained for 2-6 hours.

EXAMPLES

The following examples are provided to further illustrate the invention. All percentages therein are by weight unless otherwise indicated.

EXAMPLE 1

Preparation of 5,6,7,8-tetrahydro-2-anilinoacridone from 2-cyclohexanonecarboxylate ester in Dowtherm ® A A mixture of 18.4 g (0.1 mol) of N-phenyl-p-phenylenediamine, 18.0 g (0.11 mol) of a mixture of the methyl and ethyl esters of 2-cyclohexanonecarboxylate (Aldrich Chemical Co., 40% methyl, 60% ethyl ester), 0.2 ml of trifluoroacetic acid and 100 ml of Dowtherm ® A were heated and stirred at 85°-90° and 25 mm Hg for 1 hour, then at 115°-120° and 25 mm Hg for ½ hour. The resultant solution was cooled to room temperature and was transferred to a dropping funnel using 25 ml of Dowtherm ® A to wash the glassware. This solution was added dropwise over 1 hour to 25 ml of refluxing Dowtherm ® A in a mechanically stirred flask equipped with a steam heated condenser. Heating was continued for 1 hour after the addition was complete. The mixture was cooled to room temperature and the precipitated product was collected by filtration. The product was washed well with four 50 ml aliquots of methanol. Vacuum oven drying at 80° C. overnight gave 22.6 g (78% yield) of the product 5,6,7,8-tetrahydro-2-anilinoacridone.

EXAMPLE 2

Preparation of 2-anilinoacridone

A mixture of 70 g of 5,6,7,8-tetrahydro-2-anilinoacridone and 700 ml of Dowtherm ® A was brought to reflux in a 2-liter resin kettle, in a nitrogen atmosphere. A stainless steel mesh basket containing 14.5 g of 0.5% palladium on ⅛ inch alumina pellets was lowered into the reaction mixture. The mixture was refluxed for 18 hours. The basket was removed from the reaction mixture, which was then allowed to cool. The precipitated product was collected on a filter and washed with four 350 ml aliquots of methanol. Vacuum oven drying at 100° C. overnight gave 61.4 g (89%) of the product that was analyzed by microanalysis.

Anal. calc'd for $C_{19}H_{14}N_2O$: C, 79.69; H, 4.93; N, 9.78. Found: C, 78.85; H, 4.91; N, 9.61; C, 78.76; H, 5.14; N, 9.60.

EXAMPLE 3

Stabilization of quinacridonequinone with 2-anilinoacridone

Quinacridonequinone (85 g) was dissolved in 425 ml of 96% sulfuric acid contained in a 1000 ml four-necked flask equipped with a thermometer, mechanical stirrer, and a drying tube (calcium sulfate) to protect the sulfuric acid from atmospheric moisture. An ice bath was used to maintain the temperature of the sulfuric acid solution below 30° C. After the quinacridonequinone was in solution, 2-anilinoacridone (15.0 g) was added to the solution and the mixture agitated to achieve complete dissolution. This solution was drowned into water under conditions of high turbulence to give a pigment slurry (approximately 8% sulfuric acid). The slurry was heated with steam to 90° C. and held for two hours. The slurry was then filtered and the pigment washed acid-free with water. The water-wet pigment was reslurried in 5000 ml water, and the slurry heated with steam to 95° C. The pH of the slurry was adjusted to 9.0 with 1% aqueous sodium hydroxide and cetyltrimethylammonium chloride (5.0 g of a 50% solution in isopropyl alcohol) was added to the slurry. The slurry was held at 95° C. for four hours, and then allowed to cool to 70° C. The pH was adjusted to 7.5 with dilute sulfuric acid, and a solution of nickel sulfate hexahydrate (11.0 g) in water (200 ml) was added over five minutes. The slurry was agitated for 0.25 hour at 70° C., and then a solution of sodium carbonate (7.0 g) in water (200 ml) was added to the pigment slurry over 0.33 hour. Naphthenic acid (1.0 g) was added and the slurry agitated at 70° C. for 0.25 hour. The slurry was filtered and the pigment water washed. The water-wet pigment was dried at 65° C. overnight to give 100.9 g dry pigment.

Control

For purposes of comparison, a sample of high turbulence drowned quinacridonequinone without 2-anilinoacridone was prepared. Quinacridonequinone (60.0 g) was dissolved in 96% sulfuric acid (255 ml) and the solution drowned under conditions identical to those used for preparing the solid-solution pigment above. The drowned slurry was heated to 90° C. and held for one hour. A solution of dodecyl benzene sulfonic acid, isopropylammonium salt (1.5 g) in perclene (2.4 g) was added to the slurry, and the slurry was then held at 95° C. for 0.5 hour. The slurry was filtered and washed acid-free with water. The water-wet pigment was reslurried in 3000 ml water, homogenized, and the slurry heated to 70° C. The pH was adjusted to 7.5 with 1% aqueous sodium hydroxide and a solution of nickel sulfate hexahydrate (13.2 g) in water (240 ml) was added over five minutes. The slurry was agitated at 70° C. for 0.25 hour, and a solution of sodium carbonate (8.4 g) in water (240 ml) was added dropwise over 0.33 hour. The slurry was stirred for 0.25 hour at 70° C., filtered and washed with water. The water-wet pigment was dried overnight at 65° C. to give 64.1 g dry pigment.

Samples of the two pigments made as described above were dispersed by conventional means in a baking-type acrylic resin vehicle. Test panels coated with metallic lacquers, prepared by adding aluminum powder in the ratio of 50 parts aluminum per 50 parts pigment, were prepared by spraying suitably prepared metal panels and dryed by baking.

The panels were then exposed in Florida for 3 months facing south at an angle of 5° from the horizontal. Reflectance spectroscopy was used to determine the photodegradation of quinacridonequinone. The pigment without 2-anilinoacridone showed 7% quinacridonequinone loss while the pigment stabilized with 2-anilinoacridone showed only a 2% loss.

The pigments are further characterized by their X-ray diffraction patterns (Table 1). The X-ray diffraction patterns for both products are essentially those of quinacridonequinone. The stabilized pigment shows no evidence of the lines of 2-anilinoacridone. It is believed that the latter compound has entered the crystal lattice of the quinacridonequinone to form a solid solution therewith.

TABLE 1

X-Ray Diffraction Patterns

| Quinacridonequinone | | Solid Solution 85% Quinacridonequinone - 15% 2-Anilinoacridone | |
|---|---|---|---|
| 2θ | Intensity | 2θ | Intensity |
| 8.8 | Str. | 8.7 | Str. |
| 14.1 | Med. | 14.3 | Str. |
| 17.7 | Wk. | 17.5 | Wk. |
| 18.7 | Wk. | 18.9 | Wk. |
| 21.3 | Wk. | 21.6 | Wk. |
| 22.1 | Wk. | 22.3 | Wk. |
| 23.8 | Wk. | — | — |
| 24.4 | Str. | 24.7 | Str. |
| 25.6 | Str. | 25.9 | Str. |
| 27.2 | Str. | 27.2 | Str. |

EXAMPLE 4

Effect of varying amounts of 2-anilinoacridone on quinacridonequinone stabilization Using the high-turbulence drowning procedure described in Example 3, pigments of the following compositions were prepared:

| | Quinacridonequinone | 2-Anilinoacridone |
|---|---|---|
| A | 19.0 g | 1.0 g |
| B | 18.5 g | 1.5 g |
| C | 18.0 g | 2.0 g |
| D | 17.5 g | 2.5 g |
| E | 17.0 g | 3.0 g |

In each case, the water-wet pigment obtained from the drowning was reslurried in 1000 ml water. The slurry was heated to 95° C., and cetyltrimethylammonium chloride (0.5 g of a 50% solution in isopropyl alcohol) was added. The pH was adjusted to 9.0 and the slurry heated at 95° C. for two hours. The slurry was cooled to 70° and the pH adjusted to 7.5. A solution of nickel sulfate hexahydrate (2.2 g) in water (40 ml) was added to the slurry over five minutes, the slurry was agitated for 0.25 hour at 70° C. and a solution of sodium carbonate (1.4 g) in water (40 ml) was added dropwise over 0.33 hour. The slurry was then agitated at 70° C. for 0.25 hour, filtered and the pigment washed with water and dried overnight at 65° C. Yields of dry pigment ranged from 18.3 g to 21.7 g.

Test panels of each pigment were prepared in a baking-type acrylic resin system as metallic lacquers (50 parts aluminum powder to 50 parts pigment). The panels were exposed in Florida for 3 months facing south at an angle of 5° from the horizontal. Reflectance spectroscopy was used to determine the quinacridonequinone loss.

| Pigment | Quinacridonequinone Loss |
|---|---|
| Quinacridonequinone Control | 7% |
| A | 5% |
| B | 4% |
| C | 3% |
| D | 2% |
| E | 3% |

The data show that the optimum level of treatment is between 10 and 15% by weight of 2-anilinoacridone.

EXAMPLE 5

Physical mixture of quinacridonequinone and 2-anilinoacridone

Quinacridonequinone (8.5 g) was dissolved in 96% sulfuric acid (43 ml) and drowned into water under conditions of high turbulence. The pigment slurry was heated to 90° C. and held for one hour. Naphthenic acid (0.2 g) was added to the slurry, the temperature was increased to 95° C. and the slurry agitated for 0.5 hour. The slurry was filtered and washed acid-free with water. 2-Anilinoacridone (1.5 g) was dissolved in N,N-dimethylformamide. The water-wet quinacridonequinone filter cake was slurried into this solution and the slurry and solution mixture poured into 2000 ml water with good agitation, filtered and washed with water. The water-wet pigment was reslurried in 700 ml water and the slurry heated to 70° C. The pH was adjusted to 7.5 with 1% aqueous sodium hydroxide and a solution of nickel sulfate hexahydrate (2.2 g) in water (40 ml) was added over five minutes. The slurry was agitated for 0.25 hour at 70° C. and then a solution of sodium carbonate (1.4 g) in water (40 ml) was added dropwise over 0.33 hour. The slurry was agitated for 0.25 hour at 70° C., filtered and washed with water. The water-wet pigment was dried overnight at 65° C. to give 7.25 g dry pigment.

A sample of the pigment was dispersed in a baking-type acrylic resin vehicle. Test panels were prepared by spraying suitably prepared metal panels with a metallic lacquer (50 parts aluminum powder and 50 parts pigment) and dried by baking. The panels were exposed in Florida for 3 months facing south at an angle of 5° from the horizontal. Reflectance spectroscopy showed a 16% quinacridonequinone loss.

The pigment was further characterized by its X-ray diffraction pattern:

| $2\theta$ | Intensity |
| --- | --- |
| 7.8 | Wk. |
| 8.8 | Str. |
| 14.2 | Med. |
| 16.1 | Wk. |
| 17.7 | Wk. |
| 18.9 | Wk. |
| 21.3 | Wk. |
| 22.2 | Wk. |
| 23.8 | Wk. |
| 24.6 | Str. |
| 25.8 | Str. |
| 27.3 | Str. |

The presence of lines at $2\theta = 7.8$ and 16.1 are characteristic of 2-anilinoacridone and show that it is not in solid solution with the quinacridonequinone.

EXAMPLE 6

Effect of pigment crystallite size on dispersibility of quinacridonequinone stabilized with 2-anilinoacridone pigment drowning without post-drowning treatment Quinacridonequinone (85.0 g) was dissolved in 425 ml of 96% sulfuric acid contained in a 1000 ml four-necked flask equipped with a thermometer, mechanical stirrer and a drying tube (calcium sulfate) to protect the sulfuric acid from atmospheric moisture. An ice bath was used to maintain the temperature of the sulfuric acid solution below 30° C. After the quinacridonequinone was in solution, 2-anilinoacridone (15.0 g) was added to the solution and the mixture agitated until complete dissolution was achieved. This solution was drowned into water under conditions of high turbulence to give a pigment slurry (approximately 8% sulfuric acid). The slurry was heated with steam to 90° C. and held for one hour. A solution of dodecyl benzene sulfonic acid, isopropyl ammonium salt (2.5 g) in perclene (4.0 g) was added to this pigment slurry, and heating was continued at 95° C. for 0.5 hour. The slurry was filtered and washed acid-free with water. The water-wet pigment was reslurried in 5000 ml water, homogenized and the slurry heated to 70° C. The slurry pH was adjusted to 7.5 and a solution of nickel sulfate hexahydrate (22.0 g) in water (400 ml) was added to the agitated slurry over 5 minutes. The slurry was held at 70° C. under agitation for 0.25 hour. A solution of sodium carbonate (14.0 g) in water (400 ml) was then added dropwise over 0.33 hour. The pigment slurry was held at 70° C. under agitation for 0.25 hour. The pigment slurry was then filtered, washed with water and the water-wet pigment dried overnight at 65° C. to give 102.6 g of dry pigment. The X-ray diffraction scan obtained from this pigment showed that quinacridonequinone and 2-anilinoacridone were in solid solution. The scan also showed the average crystal diameter equal to 93 Å. Because of the small crystallite size, this pigment showed very poor dispersibility as compared to larger particle size quinacridonequinone (as prepared in the Control) drowned and treated with nickel carbonate as described above without 2-anilinoacridone.

Pigment drowning with post-drowning treatment:

Quinacridonequinone (85.0 g) was dissolved in 425 ml of 96% sulfuric acid contained in a 1000 ml four-necked flask equipped with a thermometer, mechanical stirrer and a drying tube (calcium sulfate) to protect the sulfuric acid from atmospheric moisture. An ice bath was used to maintain the temperature of the sulfuric acid solution below 30° C. After the quinacridonequinone was in solution, 2-anilinoacridone (15.0 g) was added to the solution and the mixture agitated until complete dissolution was achieved. This solution was drowned into water under conditions of high turbulence to give a pigment slurry (approximately 8% sulfuric acid). The slurry was heated to 90° and held for one hour. It was then heated to 95° and held for 0.5 hour. The slurry was then filtered and washed acid-free with water. The water-wet pigment was reslurried in 5000 ml water, homogenized and the slurry heated to 95° C. Cetyltrimethylammonium chloride (5.0 g of a 50% solution in isopropyl alcohol) was added to the slurry and the pH adjusted with 1% aqueous sodium hydroxide to 9.0. The slurry was then held at 95° C. for four hours. The slurry was allowed to cool to 70° C., the pH was adjusted to 7.5 with dilute sulfuric acid and a solution of nickel sulfate hexahydrate (11.0 g) in water (200 ml) was added over five minutes. The slurry was agitated for 0.25 hour. A solution of sodium carbonate (7.0 g) in water (200 ml) was then slowly added to the pigment slurry over 0.33 hour. Naphthenic acid (1.0 g) was then added to the slurry, agitation was continued for 0.25 hour and the pigment slurry was filtered. The pigment was water-washed and then dried overnight at 65° C. to give 99.8 g of dry pigment. The X-ray diffraction scan obtained from this pigment showed that quinacridonequinone and 2-anilinoacridone were in solid solution. The scan also showed the average crystal diameter equal to 165 Å. This pigment showed equal dispersibility to quinacridonequinone drowned and treated with nickel carbonate as described in the Control of Example 1 without 2-anilinoacridone.

EXAMPLE 7

Incorporation of 2-anilinoacridone into solid solution with quinacridonequinone by acid pasting Quinacridonequinone (17.0 g) was dissolved in 96% sulfuric acid (85 ml) in a 500 ml four-necked flask equipped with a thermometer, mechanical stirrer and a drying tube (calcium sulfate) to protect the sulfuric acid from atmospheric moisture. An ice bath was used to maintain the dissolution temperature below 30° C. When the quinacridonequinone was completely dissolved, 2-anilinoacridone (3.0 g) was added and the mixture agitated until complete dissolution occurred. The solution was then added to 2000 ml of water with rapid stirring over 0.25 hour (temperature rose from 21°-36° C.). The pigment slurry obtained was heated to 90° C. and held for one hour. Dodecyl benzene sulfonic acid, isopropylammonium salt (0.5 g) in perclene (0.8 g) was then added, the temperature was increased to 95° C., and the slurry agitated for 0.5 hour. The slurry was filtered and the pigment washed acid-free with water. The water-wet pigment was reslurried in 1000 ml water, the pH of the slurry adjusted to 7.5, the slurry homogenized and the slurry heated to 70° C. A solution of nickel sulfate hexahydrate (4.4 g) in water (80 ml) was added over five minutes and the slurry agitated for 0.25 hour at 70° C. A solution of sodium carbonate (2.8 g) in water (80 ml) was then added dropwise over 0.33 hour. The slurry was then agitated at 70° C. for 0.25 hour, filtered and the pigment washed with water. The water-wet pigment was dried at 65° C. overnight to yield 19.5 g dry pigment.

The X-ray diffraction pattern from this pigment showed no evidence of the lines for 2-anilinoacridone, thus, indicating that solid solution formation had been accomplished. The diffraction analysis also showed the average crystal diameter equal to 195 Å. This larger crystallite size results from the decreased turbulence on mixing the acid and water together in the acid pasting as compared to the high turbulence drowning technique used in the previous examples.

A sample of the pigment was dispersed in a baking-type acrylic resin vehicle. Test panels were prepared by spraying suitably prepared metal panels with a metallic lacquer (50 parts aluminum flake to 50 parts pigment) and dried by baking. The panels were exposed in Florida for three months facing south an an angle 5° from the horizontal. Reflectance spectroscopy showed a 3% quinacridonequinone loss.

EXAMPLE 8

Stabilization of quinacridonequinone with 5,6,7,8-tetrahydro-2-anilinoacridone Quinacridonequinone (8.5 g) was dissolved in 96% sulfuric acid (43 ml). After complete dissolution was achieved, 5,6,7,8-tetrahydro-2-anilinoacridone, (1.5 g) was added and agitation continued until the solid dissolved. The solution was drowned into water under conditions of high turbulence to give a pigment slurry that was heated to 90° C. After a one-hour hold period, a solution of dodecyl benzene sulfonic acid, isopropylammonium salt (0.25 g) in perclene (0.4 g) was added and heating continued at 95° C. for 0.5 hour. The slurry was filtered and the pigment washed acid-free with water. The water-wet pigment was reslurried in 700 ml water, homogenized and heated to 70° C. The pH was adjusted to 7.5 and a solution of nickel sulfate hexahydrate (2.2 g) in water (40 ml) was added over five minutes. The slurry was agitated at 70° C. for 0.25 hour and a solution of sodium carbonate (1.4 g) in water (40 ml) was added dropwise over 0.33 hour. The slurry was agitated for 0.25 hour at 70° C., filtered and the pigment washed with water. Drying at 65° C. overnight gave 8.43 g of dry pigment.

A sample of the pigment was dispersed in a baking-type acrylic resin vehicle. Test panels were prepared by spraying suitably prepared metal panels with a metallic lacquer (50 parts aluminum powder to 50 parts pigment) and dried by baking. The panel was exposed in Florida for three months facing south at an angle 5° from the horizontal. Reflectance spectroscopy showed 4% quinacridonequinone loss.

The X-ray diffraction scan of this pigment showed no evidence of lines arising from the 5,6,7,8-tetrahydro-2-anilinoacridone and it is essentially that of quinacridonequinone. It is believed that the stabilizer has entered the crystal lattice of the quinacridonequinone to form a solid solution therewith.

EXAMPLE 9

Stabilizer of quinacridonequinone with 2-aminoacridone

Quinacridonequinone (17 g) was dissolved in 96% sulfuric acid (85 ml). After complete dissolution was achieved, 2-aminoacridone (3.0 g) was added and agitation continued until the solid dissolved. The solution was drowned into water under conditions of high turbulence to give a pigment slurry that was then heated to 90° C. After a one-hour hold period, naphthenic acid (0.4 g) was added and the heating continued at 95° C. for 0.5 hour. The slurry was filtered and the pigment washed acid free with water. The water-wet pigment was reslurried in 700 ml water, homogenized and heated to 70° C. The pH was adjusted to 7.5 and a solution of nickel sulfate hexahydrate (4.4 g) in water (80 ml) was added over five minutes. A solution of sodium carbonate (2.8 g) in water (80 ml) was added dropwise over 0.33 hour. The slurry was agitated at 70° C. for 0.25 hour, filtered and the pigment washed with water. Drying at 65° C. overnight gave 18.64 g of dry pigment.

Paint panels containing this pigment were prepared and exposed in the manner described in Example 8. Reflectance spectroscopy showed a 6% pigment loss after three-month exposure.

EXAMPLE 10

Stabilization of quinacridonequinone with 6-anilinoquinolone

A solid solution of quinacridonequinone (8.5 g) and 6-anilinoquinolone (1.5 g) was prepared by the method described in Example 8. This pigment was dispersed in an acrylic paint vehicle, paint panels prepared and the panels exposed as described in Example 8. Reflectance spectroscopy showed a 3% pigment loss after three-month exposure.

INDUSTRIAL APPLICABILITY

The pigment compositions of the present invention are useful in preparing paint compositions that display improved lightfastness over paint prepared from other pigment compositions.

We claim:
1. A pigment comprising a solid solution of
   (a) 1-20% by weight based on the total of (a) and (b) of a stabilizer selected from the group consisting of 2-anilinoacridone, 5,6,7,8-tetrahydro-2-anilinoacridone, 6-anilinoquinolone, and 2-aminoacridone or mixtures thereof; and
   (b) 80-99% by weight of quinacridonequinone.
2. The pigment of claim 1 wherein the stabilizer is present in an amount of from 10-15% by weight of quinacridonequinone and stabilizer.
3. The pigment of claim 2 where the stabilizer is 2-anilinoacridone.
4. The pigment of claim 3 treated with basic nickel carbonate.

5. A method of post-treatment of the pigment of claim 1 prepared by high turbulence drowning with water of a solution of the quinacridonequinone and the stabilizer in acid to form an aqueous slurry of pigment particles comprising
- (a) heating the pigment particles in aqueous slurry to a temperature from 50°–100° C.;
- (b) adjusting the pH of the slurry to from 7.0–10.0;
- (c) adding from 2–15% by weight of a surfactant;
- (d) agitating the slurry and maintaining the temperature until an average crystal diameter of more than 100 Å is obtained.

6. The method of claim 5 wherein the slurry is heated to from 85°–100° C.

7. The method of claim 5 wherein the pH is adjusted to from 8.5–9.5.

8. The method of claim 5 wherein from 3–8% by weight surfactant is added.

9. The method of claim 5 wherein the temperature is maintained for 2–6 hours.

10. The method of claim 5 wherein the surfactant is cationic.

11. The method of claim 5 wherein the surfactant is cetyltrimethyl ammonium chloride.

12. The method of claim 5 wherein the surfactant is octylphenoxy polyethoxy ethanol.

* * * * *